Aug. 16, 1949.   J. H. JONES   2,479,495
PRUNING SAW
Filed Nov. 3, 1947
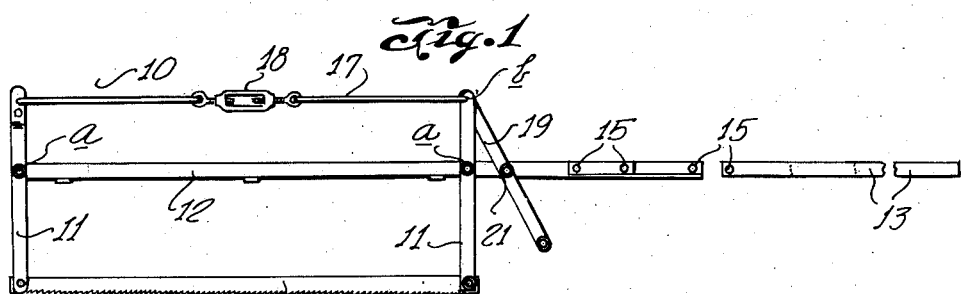
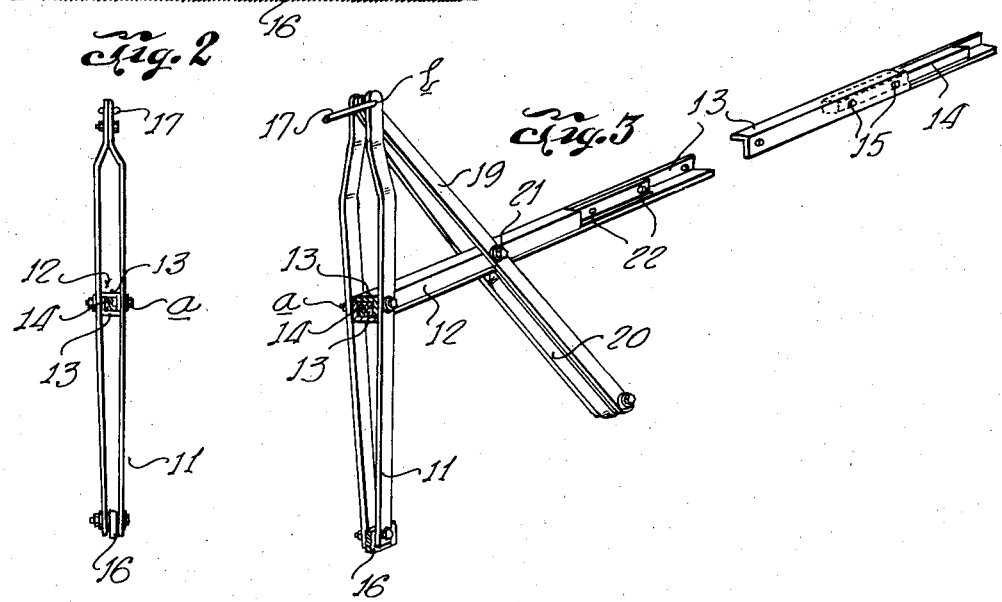
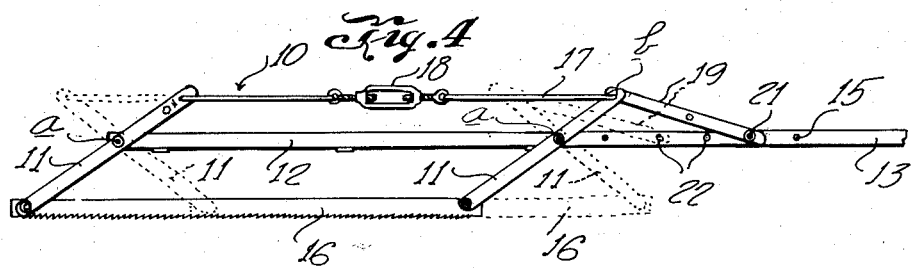
James H. Jones
INVENTOR.
ATTORNEY Patented Aug. 16, 1949

2,479,495

UNITED STATES PATENT OFFICE 2,479,495

PRUNING SAW

James H. Jones, Dallas, Tex.

Application November 3, 1947, Serial No. 783,819

5 Claims. (Cl. 30—166)

This invention relates to saws and particularly to a combination bucksaw and pruning saw.

The principal object of the invention is to provide a saw consisting of a frame having parallel saw carrying end members pivoted intermediate their ends to an extensible bar serving as a handle, one of said end members having an arm attached thereto, capable of adjustable connection with said bar to change the angular relationship of said end members with said bar, thus to vary with the width of said frame.

Another object of the invention is to provide a saw having a handle in longitudinally aligned and detachable sections, by which the saw may be manipulated for sawing limbs and branches from trees in pruning operations. When so used the frame may be narrowed so that it may be accommodated between closely spaced branches. Moreover, sections of the handle may be removed and the frame widened for use as a bucksaw.

With the foregoing objects in view, the invention has further reference to certain features of accomplishment which will become apparent as the description proceeds, taken in connection with the accompanying drawing wherein:

Figure 1 is a side elevational view of a saw constructed according to the invention, showing the frame expanded.

Figure 2 is a front end view.

Figure 3 is a fragmentary perspective view, and

Figure 4 is a side elevational view showing the saw frame contracted.

Continuing with a more detailed description of the drawing, reference numeral 10 denotes generally the frame of the saw, which consists of end members 11 which are spaced apart and pivoted at $a$ intermediate their ends to a bar 12. This bar may be of any suitable construction but it is shown as consisting of parallel angle members 13 whose flanges are in confronting relationship to define a square in transverse section. A substantially square wood filler 14 is enclosed by the two angle members 13, to which they are secured by screws 15 and this filler serves to lend rigidity to the bar whose extension beyond the frame 10 forms an elongated handle by which the frame may be manipulated in pruning trees.

The angle members 13 of the sectional bar and handle are made preferably from aluminum or other light but strong material and the wood filler 14 is of light strong wood. It will be observed that the joints between the angle members 13 are staggered so that they may be overlapped by the wood filler 14 to strengthen the same. Moreover, by removing certain of the extended sections of the handle, the latter may be shortened to terminate a spaced distance rearwardly of the rearmost frame end member 11 and thus provide a convenient handle when the frame 10 is used as a bucksaw.

The end members 11 carry on their ends a saw blade 16 which of course, is replaceable. Connected to and extending between the opposite ends of the frame members 11 is a stabilizing rod 17 having a turnbuckle 18 incorporated therein for imposing tension on the saw blade 16 or to provide for the latter's removal and replacement.

The frame end members 11 each consist of parallel straps of metal spaced apart to accommodate the bar 12 and the saw blade 16. Interposed between the straps of the rearmost end member 11 at the top thereof is the upper end of an arm consisting of metal straps 19 which depend at an angle from their pivotal point $b$ and lie, one on each side of the handle of the saw, that is, the angle members 13 rearwardly of the end member 11. A strip of wood 20 is interposed between the straps 19 below the handle to hold them apart and when the arm 19 is disposed at the angle shown in Figures 1 and 3 and secured to the handle by a bolt 21, it serves as an auxiliary handle to manipulate the frame as a bucksaw. When thus employed, the rearmost sections of the handle are removed.

It is of course apparent that without adjustment, the saw can be used in certain cases to prune trees where the limbs and branches are sufficiently wide apart to admit the frame 10. In other cases however, the limbs are closely spaced and it becomes necessary to narrow the spacing between the stabilizing rod 17 and the saw 16. This is accomplished by removing the bolt 21 which connects the auxiliary handle 19 to the main handle, removing the strip of wood 20 and again attaching the auxiliary handle 19 at its extremity to the main handle by replacing the bolt 21 in a selected one of a series of apertures 22 in the main handle. This is done after having displaced the frame end members 11 on their pivots $a$ to assume the relative positions shown in Figure 4. The width of the saw frame is thus reduced materially although all of the frame elements remain in relative parallelism and are rigidly so held by the angular arm 19. The degree of adjustment is determined by selection of the hole 22 in the handle which is to receive the bolt 21 for securing the arm 19 to the handle.

Manifestly, the construction as shown and described is capable of some modification and such modification as may be construed to fall within the scope and meaning of the appended claims is also considered to be within the spirit and intent of the invention.

What is claimed is:

1. In a saw, an adjustable frame including parallel end members, a saw blade extending between and connected at each end to an end of said end members, a bar parallel with said saw blade and extending beyond said frame in detachable sections, a stabilizing rod connecting the opposite ends of said end members and capable of length adjustment and an angular arm jointly pivotally at one end thereof to the upper end of one of said frame end members and attached to one of a series of selective positions diposed in spaced relationship on the extended portion of said bar.

2. In a saw, a frame adapted for width adjustment and comprised of a pair of spaced apart and parallel end members, a bar to which said end members are pivoted intermediate their ends, said bar extending rearwardly of said frame in longitudinally aligned and removable sections defining a handle, a stabilizing bar connected to and extending between the ends of said end members and capable of length adjustment, a saw carried by the opposite ends of said members, an arm pivotally attached to the top of the rearmost of said end members and means for securing said arm to a selected one of a series of points on said handle.

3. A saw including a frame composed of a pair of spaced apart and parallel end members, a saw blade carried jointly by the ends of said members, and extensible rod carried by the opposite ends of said members in parallelism with said saw, a bar between and parallel with said saw and rod to which said end members are pivoted intermediate their ends, said bar extending rearwardly of said frame in detachable sections to form a handle and means extending between the rearmost of said end members and said handle for holding said end members in a selected one of a variety of pivotally displaced positions with respect to said bar.

4. A saw including a frame, the latter comprising an elongated bar in longitudinally aligned and detachable sections and a pair of parallel, spaced apart end members pivoted intermediate their ends to said bar, means connecting the upper ends of said end members for common movement and capable of length adjustment a saw blade carried by the opposite ends of said end members and means extending between the top of one of said end members and said bar for holding said end members in one of a series of adjusted positions in relation to said bar to vary the width of said frame.

5. A saw as set forth in claim 4, further defined in that the last named means consists of an angular arm having a point of securement midway of its ends to the bar to constitute a handle auxiliary to the latter.

JAMES H. JONES.

No references cited.